(12) United States Patent
Gomes et al.

(10) Patent No.: US 9,791,300 B2
(45) Date of Patent: Oct. 17, 2017

(54) INDUCTIVE POSITION-SENSING

(71) Applicant: TEXAS INSTRUMENTS INCORPORATED, Dallas, TX (US)

(72) Inventors: Alfred V. Gomes, Sunnyvale, CA (US); George P. Reitsma, Redwood City, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 49 days.

(21) Appl. No.: 14/627,729

(22) Filed: Feb. 20, 2015

(65) Prior Publication Data

US 2015/0233695 A1    Aug. 20, 2015

Related U.S. Application Data

(60) Provisional application No. 61/942,442, filed on Feb. 20, 2014.

(51) Int. Cl.
*G01B 7/00* (2006.01)
*G01D 5/20* (2006.01)

(52) U.S. Cl.
CPC .................. *G01D 5/2086* (2013.01)

(58) Field of Classification Search
None
See application file for complete search history.

(56) References Cited

U.S. PATENT DOCUMENTS

| 6,011,389 A * | 1/2000 | Masreliez | G01D 5/2046 324/207.17 |
|---|---|---|---|
| 7,576,533 B2 * | 8/2009 | Bach | G01P 3/488 324/207.15 |
| 7,994,777 B2 * | 8/2011 | Rollins | H03K 17/9505 324/207.16 |
| 8,421,446 B2 * | 4/2013 | Straubinger | G01D 5/202 324/207.15 |

* cited by examiner

*Primary Examiner* — Jermele M Hollington
*Assistant Examiner* — Douglas X Rodriguez
(74) *Attorney, Agent, or Firm* — Andrew Viger; Charles A. Brill; Frank D. Cimino

(57) ABSTRACT

One example includes a position sensing system. The system includes an inductive position element that is moveable and comprises a position inductor. The system also includes a plurality of inductive load elements. Each of the inductive load elements includes a load inductor. Each of the plurality of inductive load elements can be selectively controlled in response to a modulation signal to provide a corresponding mutual inductance between the position inductor and the respective load inductor, the corresponding mutual inductance depending on a position of the inductive position element relative to the respective load inductor. The system further includes a position controller configured to generate the position and modulation signals and to calculate the position of the inductive position element relative to the plurality of inductive load elements based on a difference of the position signal with respect to the mutual inductance between the position inductor and each respective load inductor.

20 Claims, 6 Drawing Sheets

INDUCTIVE POSITION-SENSING

CROSS-REFERENCE TO RELATED APPLICATION

This application claims the benefit of U.S. Provisional Patent Application No. 61/942,442, filed Feb. 20, 2014, and entitled "ACCURATE INDUCTIVE POSITION SENSING USING LOAD MODULATION AND ADDITIVE FLUX TECHNIQUES WITH PHASED ARRAY INDUCTORS", which is incorporated herein by reference in its entirety.

TECHNICAL FIELD

This disclosure relates generally to electronic sensors, and more specifically to an inductive position-sensing system.

BACKGROUND

Position sensing techniques can be implemented for a variety of purposes to determine the location of a position element in two-dimensions, such as based on lateral movement or axial movement of the position element in two-dimensional space. As an example, a rotation encoder can implement position sensing to provide angular position data with respect to an axis of rotation for a variety of purposes. Position sensing, particularly in angular position sensing, can be implemented in a variety of ways, such as based on optical and/or electrical signals to sense movement of position elements laterally or about the rotational axis. However, a number of position sensing techniques involve significant circuitry and/or complex control systems that can often be expensive. Additionally, certain types of position sensing techniques (e.g., optical encoders) can be sensitive to contamination, while other types of position sensing techniques may require an electrical connection between moving and non-moving parts, and can therefore suffer from mechanical failure. Furthermore, position sensing techniques that can be based on the use of permanent magnets, such as Hall sensors, can experience deleterious effects resulting from temperature drift.

SUMMARY

One example includes a position sensing system. The system includes an inductive position element that is moveable and comprises a position inductor. The system also includes a plurality of inductive load elements. Each of the inductive load elements includes a load inductor. Each of the plurality of inductive load elements can be selectively controlled in response to a modulation signal to provide a corresponding mutual inductance between the position inductor and the respective load inductor, the corresponding mutual inductance depending on a position of the inductive position element relative to the respective load inductor. The system further includes a position controller configured to generate the position and modulation signals and to calculate the position of the inductive position element relative to the plurality of inductive load elements based on a difference of the position signal with respect to the mutual inductance between the position inductor and each respective load inductor.

Another example includes a method for measuring a position of an inductive position element. The method includes providing a position signal through a position inductor of the inductive position element. The method also includes providing a plurality of modulation signals to a respective plurality of inductive load elements that each comprise a load inductor to selectively control the plurality of load elements to provide a respective mutual inductance between the position inductor and the respective load inductor, and monitoring the position inductor via the position signal. The method further includes calculating a position of the inductive position element relative to the plurality of inductive load elements based on a difference of the position signal with respect to the mutual inductance between the position inductor and the respective load inductor associated with each of the plurality of inductive load elements.

Another example includes a position sensing system. The system includes an inductive position element that is configured to rotate about an axis and comprises a plurality of position inductors arranged in series that are configured to receive a position signal. Every alternating one of the plurality of position inductors has an opposite polarity relative to the remaining plurality of position inductors. The system also includes a plurality of inductive load elements, each of the plurality of inductive load elements comprising a load inductor. Each of the plurality of inductive load elements can be selectively controlled in response to a modulation signal to provide a corresponding mutual inductance between the position inductor and the respective load inductor, such that each of the plurality of inductive load elements are sequentially activated in response to the respective modulation signal provided to each of the respective plurality of inductive load elements. The corresponding mutual inductance depends on an angular position of the inductive position element relative to the respective load inductor. The system further includes a position controller configured to generate the position and modulations signals and to calculate the angular position of the inductive position element relative to the plurality of inductive load elements based on a difference of the position signal with respect to the mutual inductance between the position inductor and the respective load inductor associated with each of the plurality of inductive load elements.

DETAILED DESCRIPTION

This disclosure relates generally to electronic sensors, and more specifically to an inductive position-sensing system. The system can be implemented to inductively monitor position based on mutual inductance for lateral movement or rotational movement about an axis in a plane. The position sensor can include an inductive position element that is configured to move, and includes at least one position inductor, with each of the at least one position inductor being arranged in series, that is configured to receive a position signal generated by a position controller. The system also includes a plurality of inductive load elements that each includes a load inductor. The position controller is also configured to generate a plurality of modulation signals that are configured to selectively activate the plurality of inductive load elements to provide an inductive load on the at least one position inductor based on a mutual inductance between the at least one position inductor and the load inductor(s). As an example, the modulation signals can be provided in a predetermined sequence to sequentially provide the inductive load from each of the inductive load elements in the predetermined sequence. Therefore, the position controller can be configured to calculate the position of the inductive position element based on changes to the inductive load of the position signal in response to the changes to the mutual inductance based on the sequential activation of the inductive load elements.

As an example, the modulation signals can be provided to activate switches in each of the inductive load elements, such that the inductive load elements are configured as passive circuits that include an inductive loop or a resonator (e.g., based on including a capacitor). As another example, the position signal can likewise be provided to the inductive load elements, such that the position signal can be amplified and phase-shifted via the modulation signals to provide an additive or subtractive flux through the position inductor. Therefore, the position controller can detect the position of the inductive position element based on changes to the inductive load implemented by the inductive load elements in a variety of ways. As another example, the inductive position element can be configured to rotate about an axis, such that the position inductors can include an inductive coupling inductor to provide inductive coupling to the position controller for receiving the position signal, at least one position inductor that is disposed along approximately 180° of the inductive position element to provide a coarse angular position measurement via a respective one of the inductive load elements, and a plurality of other position inductors that are arranged in a polar array with respect to the axis to provide fine angular measurements of the rotation of the inductive position element.

Figure 1:
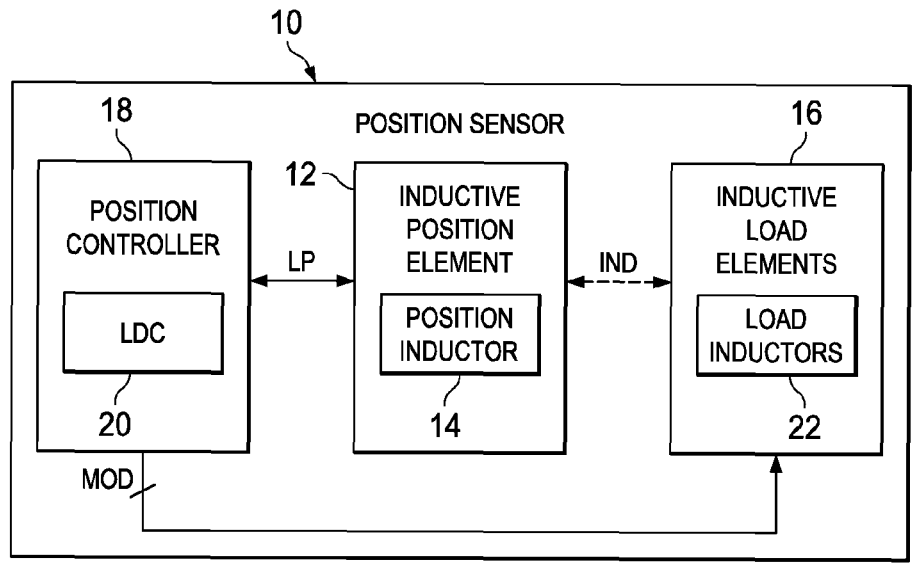
FIG. 1 illustrates an example of a position sensor.

FIG. 1 illustrates an example of a position sensor 10. The position sensor 10 can be implemented in a variety of position sensing applications to detect a position of a device in a two-dimensional plane. For example, the position sensor 10 can be configured as an angular encoder to detect angular position.

The position sensor 10 includes an inductive position element 12 that is configured to move in a plane, such as laterally in one or two dimensions along the plane or rotating in the plane about an axis. The inductive position element 12 includes at least one position inductor 14, such as arranged in series with respect to each other. As an example, every alternating one of the at least one position inductor 14 can have an opposite polarity relative to the remaining at least one position inductor 14. The position sensor 10 also includes a plurality of inductive load elements 16 that are positioned statically (e.g., fixed in position) with respect to the inductive position element 12. The system further includes a position controller 18 that is configured to calculate a position of the inductive position element 12 relative to the inductive load elements 16, as described herein. In the example of FIG. 1, the position controller 18 includes an inductance sensor (LDC) 20 that is configured to generate a position signal LP that is provided to the inductive position element 12, such that the position signal LP flows through the at least one position inductor 14 of the inductive position element 12. Each of the inductive load elements 16 includes a load inductor 22 that is configured to provide an inductive load on the position inductor(s) 14 of the inductive position element 12 in response to being activated. In the example of FIG. 1, the position controller 18 is configured to provide a plurality of modulation signals MOD to the respective inductive load elements 16 to selectively activate the inductive load elements 16, such as in a predetermined sequence.

In response to the selective activation of the inductive load elements 16, the LDC 20 can be configured to calculate a position of the inductive position element 12 based on a mutual inductance IND between the inductive position element 12 and the inductive load elements 16. As an example, the position controller 18 can monitor an inductance of the position signal LP (e.g., via a resonance impedance or inductance), which can change in response to the selective activation of the inductive load elements 16 via the respective modulation signals MOD. For example, in response to the selective activation of the inductive load elements 16, the load inductor 22 of a respective one of the inductive load elements 16 can provide a load on the position inductor(s) 14 of the inductive position element 12 based on the mutual inductance IND, with the amount of load, and thus the magnitude of the inductance of the position signal LP, being dependent on a proximity of the position inductor(s) 14 relative to the load inductor 22 of the respective one of the inductive load elements 16. Therefore, based on the selective activation of the inductive load elements 16 via the respective modulation signals MOD, the LDC 20 can determine a difference in the inductive load on the position inductor(s) 14 based on the respective difference of the mutual inductance IND between the position inductor(s) 14 and the respective load inductors 22. Accordingly, the LDC 20 is configured to calculate the relative position of the position inductor(s) 14 and the load inductors 22, and thus the relative position of the inductive position element 12 with respect to the fixed position of the inductive load elements 16.

Figure 2:
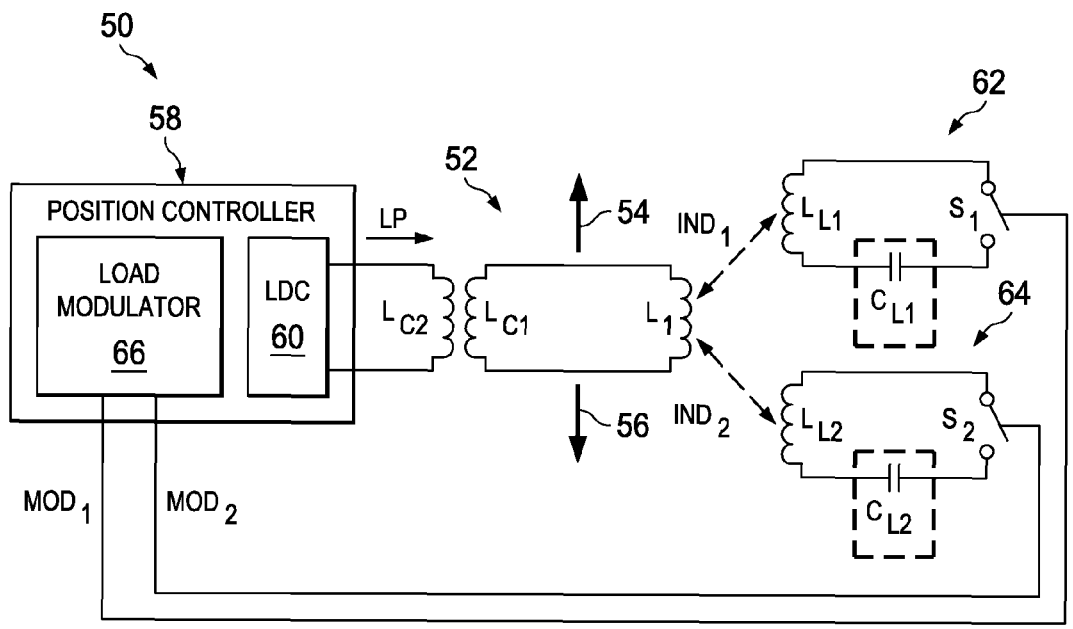
FIG. 2 illustrates an example of a position sensor circuit.

FIG. 2 illustrates an example of a position sensor circuit 50. The position sensor circuit 50 can correspond to the position sensor 10 in the example of FIG. 1. Therefore, the position sensor circuit 50 can be implemented in a variety of position sensing applications to detect a position of a device in a two-dimensional plane, such as to detect angular position.

The position sensor 50 includes an inductive position element 52 that is configured to move in a plane, such as laterally in one or two dimensions along the plane or rotating in the plane about an axis. In the example of FIG. 2, the movement of the inductive position element 52 is demonstrated by a first arrow 54 in a first direction and a second arrow 56 in a second direction opposite the first direction. The inductive position element 52 includes a position inductor $L_1$ arranged in a loop with an inductive coupling inductor $L_{C1}$. The system further includes a position controller 58 that is configured to calculate a position of the inductive position element 52, as described herein. In the example of FIG. 2, the position controller 58 includes an LDC 60 that is configured to generate a position signal LP that is provided to the inductive position element 52. As an example, the position signal LP can be configured as an AC signal having a predetermined frequency, as generated by the LDC 60. In the example of FIG. 2, the position signal LP is provided through an inductor $L_{C2}$, such that the position signal LP is induced into the inductive position element 52 to flow through the position inductor $L_1$ via the inductive coupling inductor $L_{C1}$. Therefore, the position signal LP is not conductively coupled to the inductive position element 52, and is thus galvanically isolated, such that the inductive position element 52 can be arranged, for example, as a disc or other rotating element (e.g., for calculation of angular position).

The position sensor 50 also includes a first inductive load element 62 and a second inductive load element 64 that are each positioned statically (e.g., fixed in position) with respect to the inductive position element 52. The first inductive load element 62 includes a load inductor $L_{L1}$ and a switch $S_1$, and the second inductive load element 64 includes a load inductor $L_{L2}$ and a switch $S_2$. In the example of FIG. 2, the position controller 58 includes a load modulator 66 that is configured to generate a first modulation signal $MOD_1$ that is provided to the switch $S_1$ and a second modulation signal $MOD_2$ that is provided to the switch $S_2$. Thus, the load modulator 66 can selectively assert the modulation signals $MOD_1$ and $MOD_2$ to selectively activate the respective switches $S_1$ and $S_2$, thus creating a closed circuit to sequentially activate the respective first and second inductive load elements 62 and 64. Upon activation of the respective one or both of the first and second inductive load elements 62 and 64, the respective one or both of the load inductors $L_{L1}$ and $L_{L2}$ become inductively coupled with the position inductor $L_1$ to provide a respective mutual inductance $IND_1$ and/or $IND_2$ between the position inductor $L_1$ and the respective load inductors $L_{L1}$ and/or $L_{L2}$. Based on a disparate position of each of the load inductors $L_{L1}$ and $L_{L2}$, displacement of the position inductor $L_1$ relative to the load inductors $L_{L1}$ and $L_{L2}$ can provide different values of the respective mutual inductances $IND_1$ and $IND_2$, and thus a different inductive load on the position inductor $L_1$. In the example of FIG. 2, movement of the inductive position element 52 in the direction of the arrow 54 can result in a larger mutual inductance $IND_1$ relative to the mutual inductance $IND_2$, whereas movement of the inductive position element 52 in the direction of the arrow 56 can result in a larger mutual inductance $IND_2$ relative to the mutual inductance $IND_1$, based on the position in three-dimensional space of the position inductor $L_1$ relative to the respective load inductors $L_{L1}$ and $L_{L2}$.

The position controller 58 can be configured to identify the contributions of the load inductors $L_{L1}$ and $L_{L2}$ to the inductive load of the position signal $L_1$ based on a time modulation of the modulation signals $MOD_1$ and $MOD_2$ via the load modulator 66. Therefore, the LDC 60 can be configured to monitor changes to the inductive load of the position signal $L_1$ (e.g., via a resonance impedance or inductance) based on the selective activation of the first and second inductive load elements 62 and 64 based on changes to the inductance of the position signal LP through the position inductor $L_1$ (e.g., via the inductive coupling of the inductors $L_{C1}$ and $L_{C2}$). Therefore, the position controller 58 can be configured to calculate a position of the inductive position element 52 relative to the fixed position of the inductive load elements 62 and 64 based on the changes to the inductance of the position signal LP through the position inductor $L_1$ in response to the selective activation of the first and second inductive load elements 62 and 64.

It is to be understood that the position sensor circuit 50 is not intended to be limited to the example of FIG. 2. As an example, in the example of FIG. 2, the first inductive load element 62 includes a capacitor $C_{L1}$ and the second inductive load element 64 includes a capacitor $C_{L1}$. Thus, the capacitor $C_{L1}$ and the inductor $L_{L1}$ can form a resonator with respect to the first inductive load element 62, and the capacitor $C_{L1}$ and the inductor $L_{L2}$ can form a resonator with respect to the second inductive load element 64. As an example, the resonators of the respective first and second inductive load elements 62 and 64 can be frequency tuned to the frequency of the position signal LP. Therefore, the position controller 58 can be configured to measure changes to a resonance impedance of the position signal LP instead of changes to the inductance of the position signal LP. As a result, the current of the position signal LP can be amplified by a quality factor (Q factor) of the resonators formed in the respective first and second inductive load elements 62 and 64. While the capacitors $C_{L1}$ and $C_{L1}$ are demonstrated in the example of FIG. 2, they are provided by example, and can be omitted in the position sensor circuit 50 described herein. Additionally, while the position sensor circuit 50 is demonstrated as including only a single position inductor (e.g., position inductor $L_1$), and while the position sensor circuit 50 is demonstrated as including only two inductive load elements (e.g., the inductive load elements 62 and 64), a given position sensor circuit can include more position inductors and corresponding inductive load elements, as described in greater detail herein.

Figure 3:
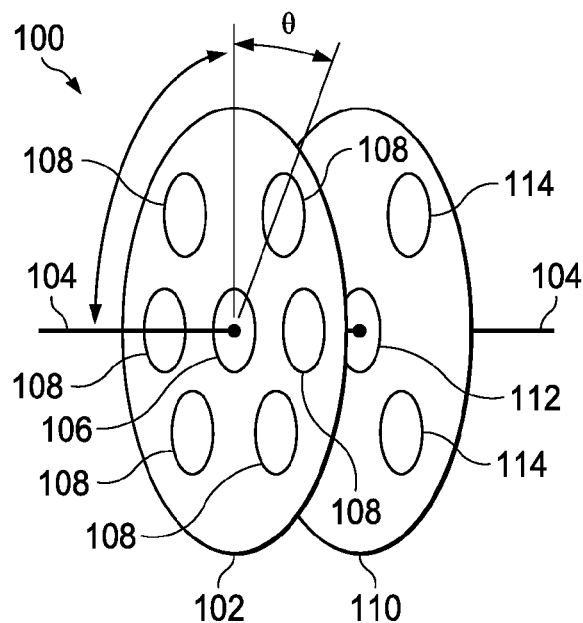
FIG. 3 illustrates an example of an angular position sensor.

FIG. 3 illustrates an example of an angular position sensor 100. The angular position sensor 100 can correspond to a portion of the position sensor 10, and can operate substantially similar to the position sensor circuit 50 described previously. Thus, reference is to be made to the examples of FIGS. 1 and 2 in the following description of the example of FIG. 3.

The angular position sensor 100 includes an inductive position element 102 that is configured as a disc that rotates about an axis 104. The inductive position element 102 includes an inductive coupling inductor 106 that substantially surrounds the axis 104, such that the inductive coupling inductor 106 is disposed about approximately 360° with respect to the axis 104. The inductive position element 102 also includes a plurality of position inductors 108 (e.g., six in the example of FIG. 3) that are wired in series and arranged in a polar array about the inductive position element 102 with respect to the axis 104, such as disposed at approximately equal angles and distances with respect to the axis 104. For example, every alternating one of the position inductors 108 has an opposite polarity relative to the remaining position inductors 108. As an example, the inductive position element 102 can be configured as a printed circuit board (PCB), such that the inductive coupling inductor 106 and the position inductors 108 can be printed on a surface of the PCB.

The angular position sensor 100 also includes a stationary element 110 that can likewise be configured as a PCB that is substantially centered about and stationary with respect to the axis 104. The stationary element 110 includes an inductor 112 that substantially surrounds the axis 104, such that the inductor 112 is disposed about approximately 360° with respect to the axis 104. The inductor 112 is configured to cooperate with the inductive coupling inductor 106 to form a position-independent transformer to provide the position signal LP to the position inductors 108, similar to as described previously in the example of FIG. 2. The stationary element 110 also includes a pair of load inductors 114 that can each be associated with a respective inductive load element (e.g., substantially similar to the inductive load elements 62 and 64 in the example of FIG. 2). As an example, the load inductors 114 can correspond to the load inductors $L_{L1}$ and $L_{L2}$. The load inductors 114 are arranged on the stationary element 110 at predetermined angles with respect to the axis 104. As an example, similar to as described previously, the inductor 112 and the load inductors 114 can be printed on a surface of the PCB that forms the stationary element 110.

Similar to as described previously, a position controller (not shown), such as the position controller 18, can be configured to calculate an angular position θ of the inductive position element 102 relative to the load inductors 114, and thus the fixed position of the stationary element 110. For example, the position controller 18 can provide modulation signals MOD to selectively activate the inductive load elements 16, such that the position controller 18 can calculate a position of the inductive position element 102 based on a mutual inductance IND between one or more of the position inductors 108 and the load inductors 114. Therefore, the position controller 18 can monitor an inductance of the position signal LP that flows through the position inductors 108, which can change in response to the selective activation of the inductive load elements that include the respective load inductors 114 via the respective modulation signals MOD. Accordingly, the position controller 18 can calculate the angular position θ of the inductive position element 102 relative to the load inductors 114.

Figure 4:
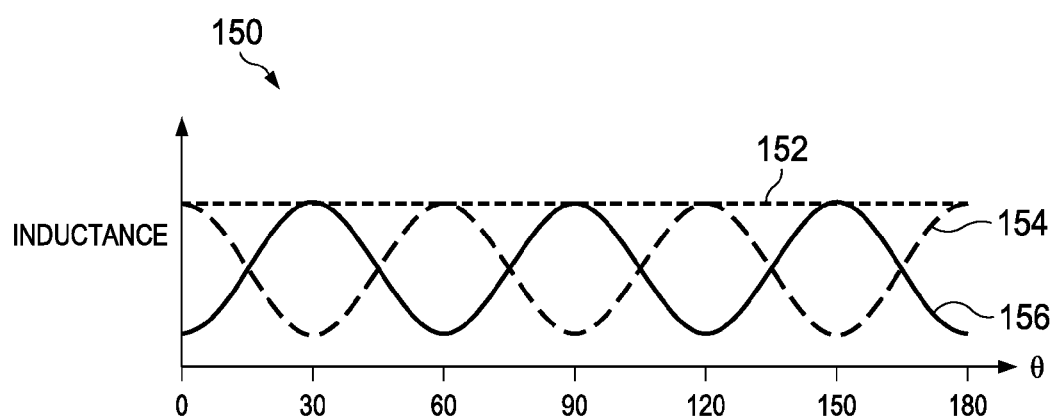
FIG. 4 illustrates an example of a graph of inductance relative to rotation angle.

FIG. 4 illustrates an example of a graph 150 of inductance relative to rotation angle. The graph 150 can correspond to rotation of the inductive position element 102, such that the position controller 58 can calculate the angular position θ of the inductive position element 102. The graph 150 can thus correspond to an inductance of the position signal LP based on selective activation of the first and second inductive load elements 62 and 64. Therefore, reference is to be made to the examples of FIGS. 1-3 in the following description of the example of FIG. 4.

The graph 150 demonstrates a first inductance line 152 over angle, demonstrated by the dotted line, a second inductance line 154 over angle, demonstrated by the dashed line, and a third inductance line 156 over angle, demonstrated by the solid line. The first inductance line 152 can correspond to deactivation of both of the switches SW1 and SW2 in the example of FIG. 2, and thus no inductive load on the position inductors 108 (e.g., corresponding to the position inductor $L_1$). Therefore, the first inductance line 152 corresponds to a maximum inductance of the position signal LP, and thus no inductive load on the position signal LP via mutual inductance $IND_1$ and $IND_2$. The second inductance line 154 can correspond to activation of the switch SW1 and deactivation of the switch SW2, and thus activation of the first inductive load element 62 to provide the mutual inductance $IND_1$ between one of the position inductors 108 and one of the load inductors 114 (e.g., the load inductor $L_{L1}$). Therefore, the second inductance line 154 is demonstrated as a sinusoid having a period that spans 60°. Similarly, the third inductance line 156 can correspond to activation of the switch SW2 and deactivation of the switch SW1, and thus activation of the second inductive load element 64 to provide the mutual inductance $IND_2$ between one of the position inductors 108 and one of the load inductors 114 (e.g., the load inductor $L_{L2}$). Therefore, the third inductance line 156 is demonstrated as a sinusoid having a period that spans 60°, and which is 30° out-of-phase of the second inductance line 154. Therefore, at each approximately 15° increment between the local minimums and maximums of each of the second and third inductance lines 154 and 156, the inductance values of the second and third inductance lines 154 and 156 are approximately equal, thus representing an angular position of a given position inductor 108 that is equidistant between the load inductors 114.

Additionally, based on the alternating polarity of the position inductors 108, an angular position of the inductive position element 102 such that a given one of the position inductors 108 is positioned approximately equidistant between the load inductors 114 corresponds to a peak maxima of the second and third inductance lines 154 and 156. Therefore, the alternating polarity of the position inductors 108 results in the mutual inductance between the position inductor 108 and each of the load inductors 114 being approximately equal and opposite at the approximately equidistant position to substantially cancel the flux in the position inductor 108 to result in a substantial maximum change in the inductance of the position signal LP per degree of change of angular position θ. Additionally, an angular position of the inductive position element 102 such that a given one of the position inductors 108 is positioned to be approximately aligned with one of the load inductors 114 (e.g., such that a next sequential position inductor 108 is likewise approximately aligned with the other of the load inductors 114) corresponds to a local minima of the second and third inductance lines 154 and 156. Therefore, the alternating polarity of the position inductors 108 results in the mutual inductance having a greatest difference between the respective position inductor 108 and the respective load inductors 114, likewise resulting in another substantial maximum change in the inductance of the position signal LP per degree of change of angular position θ.

Therefore, similar to as described previously, the position controller 58 can be configured to calculate the angular position θ of the inductive position element 102 relative to the load inductors 114 based on the changes to the inductance of the position signal LP between activation of the first and second inductive load elements 62 and 64 based on the respective differences between the mutual inductance $IND_1$ and $IND_2$. For example, the modulation signals $MOD_1$ and $MOD_2$ can be provided in an alternating sequence to alternately activate the first and second inductive load elements 62 and 64 to provide varying load on the position signal LP via the respective mutual inductances $IND_1$ and $IND_2$. Therefore, based on a difference in the inductance of the position signal LP in response to the varying load on the position signal LP via the respective mutual inductances $IND_1$ and $IND_2$, the position controller 58 can calculate the angular position θ of the inductive position element 102. In the example of FIG. 4, the periods of the second and third inductance lines 154 and 156 repeat every 60°. As a result, the angular position sensor 100 has a detection range that is limited to 60°. To increase the detection range for detecting the angular rotation θ, the angular position sensor 100 can include additional position inductors and corresponding inductive load elements.

Figure 5:
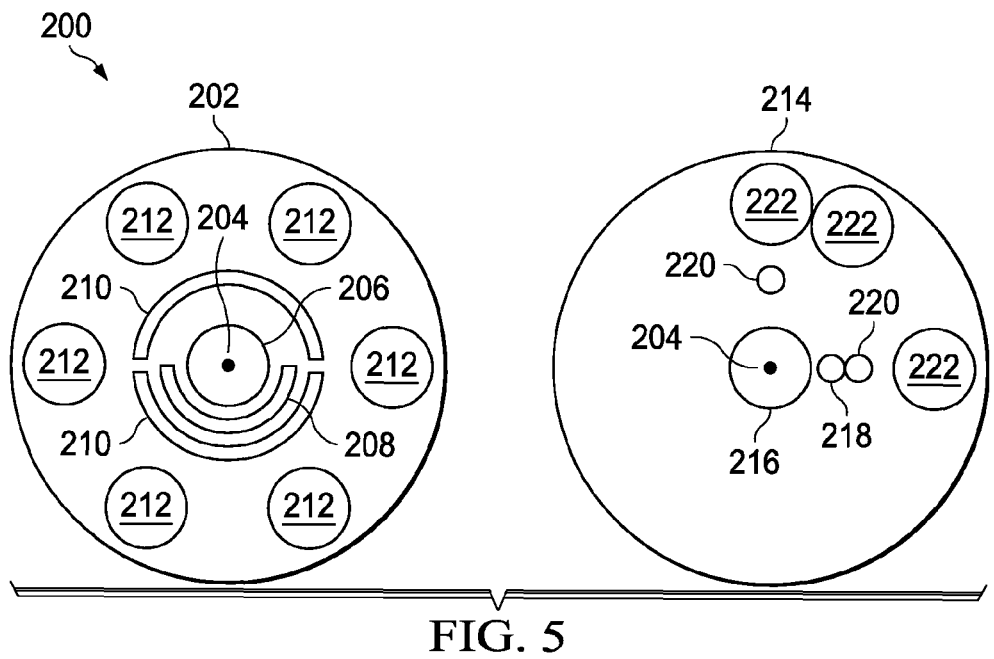
FIG. 5 illustrates another example of an angular position sensor.

FIG. 5 illustrates an example of an angular position sensor 200. The angular position sensor 200 can correspond to a portion of the position sensor 10, and can operate substantially similar to the position sensor circuit 50 described previously. Thus, reference is to be made to the examples of FIGS. 1 and 2 in the following description of the example of FIG. 3. Unlike the angular position sensor 100 which is demonstrated in the example of FIG. 3 in a plan view, the angular position sensor 200 is demonstrated in a deconstructed view.

The angular position sensor 200 includes an inductive position element 202 that is configured as a disc that rotates about an axis 204. The inductive position element 202 includes an inductive coupling inductor 206 that substantially surrounds the axis 204, such that the inductive coupling inductor 206 is disposed about approximately 360° with respect to the axis 204. The inductive position element 202 also includes a first position inductor 208 that is disposed in a contiguous approximately 180° portion about the axis 204, and a pair of second position inductors 210 that are disposed in contiguous approximately 180° portions about the axis 204 opposite each other and radially farther from the axis 204 relative to the first position inductor 208. The inductive position element 202 further includes a plurality of third position inductors 212 (e.g., six in the example of FIG. 5) that are arranged in a polar array about the inductive position element 202 with respect to the axis 204, such as disposed at approximately equal angles and distances with respect to the axis 204. The position inductors 208, 210, and 212 can all be wired in series with respect to each other, with the position inductors 210 being wired in opposite polarity with respect to each other, and with every alternating one of the position inductors 212 being wired with an opposite polarity relative to the other position inductors 212. As an example, the inductive position element 202 can be configured as a PCB, such that the inductive coupling inductor 206 and the position inductors 208, 210, and 212 can be printed on a surface of the PCB.

The angular position sensor 200 also includes a stationary element 214 that can likewise be configured as a PCB that is substantially centered about and stationary with respect to the axis 204. Therefore, the inductive position element 202 and the stationary element 214 are each approximately centered about the axis 204, and are thus demonstrated in the deconstructed view for ease of demonstration and explanation. The stationary element 214 includes an inductor 216 that substantially surrounds the axis 204, such that the inductor 216 is disposed about approximately 360° with respect to the axis 204. The inductor 216 is configured to cooperate with the inductive coupling inductor 206 to form a position-independent transformer to provide the position signal LP to the position inductors 212, similar to as described previously in the example of FIG. 2. The stationary element 214 also includes a first load inductor 218 that is associated with a respective inductive load element and which is to provide inductive coupling with the respective first position inductor 208, and a pair of second load inductors 220 that are associated with respective inductive load elements and which are to provide inductive coupling with the respective second position inductors 210. In the example of FIG. 5, the second load inductors 220 are arranged orthogonally with respect to each other in an angle about the axis 204. Furthermore, the stationary element 214 includes a set of third load inductors 222 that are associated with respective inductive load elements and which are to provide inductive coupling with the respective third position inductors 212. In the example of FIG. 5, the third load inductors 222 are arranged at predetermined angles with respect to the axis 204. For example, a pair of the third load inductors 222 can be arranged orthogonally with respect to each other in an angle about the axis 204, with an additional one of the third load inductors being arranged 30° in an angular offset from another one of the third load inductors 222. As an example, similar to as described previously, the inductor 216 and the load inductors 218, 220, and 222 can be printed on a surface of the PCB that forms the stationary element 214.

Similar to as described previously, a position controller (not shown), such as the position controller 18, can be configured to calculate an angular position θ of the inductive position element 202 relative to the load inductors 218, 220, and 222, and thus the fixed position of the stationary element 214. For example, the position controller 18 can provide modulation signals MOD to selectively activate the inductive load elements 16, such that the position controller 18 can calculate a position of the inductive position element 202 based on a mutual inductance IND between one or more of the position inductors 208, 210, and 212 and the respective load inductors 218, 220, and 222. Therefore, the position controller 18 can monitor an inductance of the position signal LP that flows through the position inductors 208, 210, and 212, which can change in response to the selective activation of the inductive load elements that include the respective load inductors 218, 220, and 222 via the respective modulation signals MOD. Accordingly, the position controller 18 can calculate the angular position θ of the inductive position element 202 relative to the load inductors 218, 220, and 222.

Figure 6:
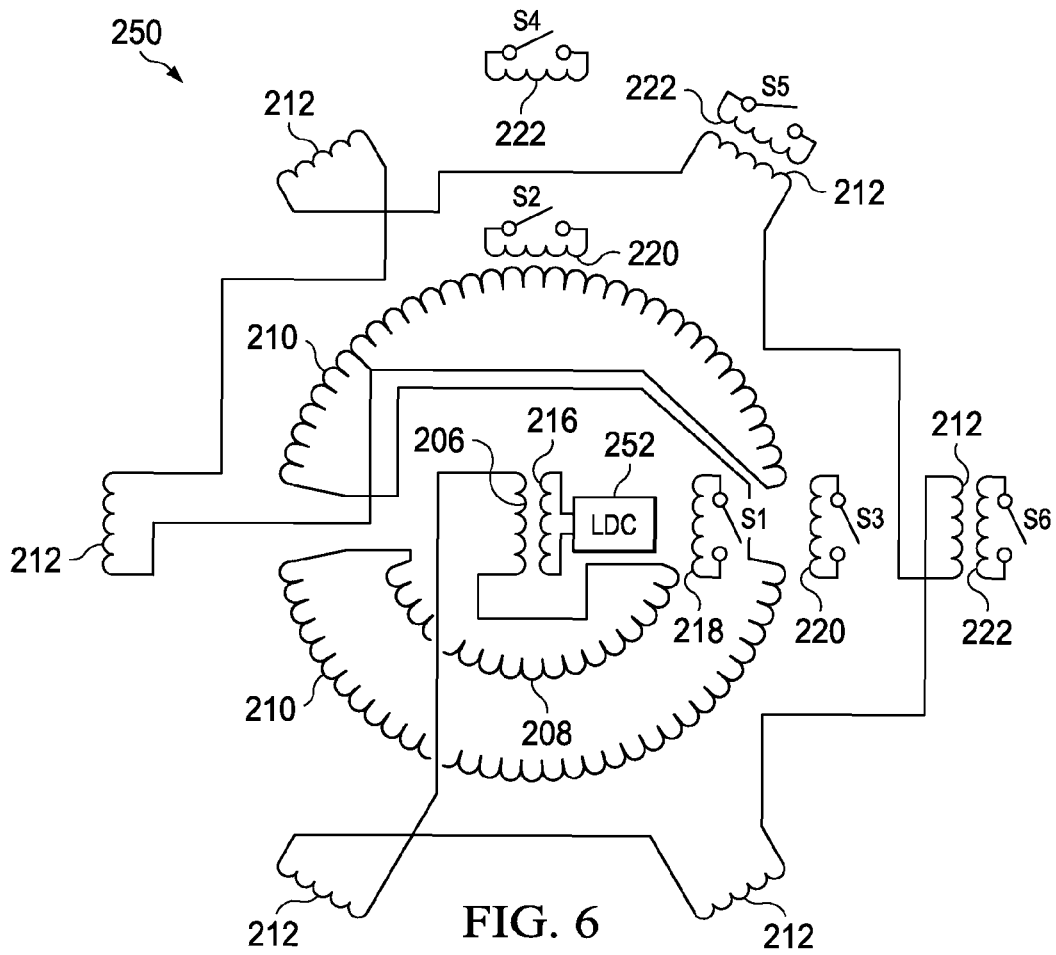
FIG. 6 illustrates an example of an angular position sensor circuit.

FIG. 6 illustrates an example of an angular position sensor circuit 250. The angular position sensor circuit 250 can correspond to the position inductors 208, 210, and 212 and the load inductors 218, 220, and 222 associated with the angular position sensor 200 in the example of FIG. 5. Therefore, reference is to be made to the example of FIG. 5 in the following description of the example of FIG. 6. The angular position sensor circuit 250 is demonstrated in an approximately radially arrangement, similar to the angular position sensor 200.

The example of FIG. 6 demonstrates the inductive coupling of the position inductors 208, 210, and 212 and the load inductors 218, 220, and 222 with respect to each other. The angular position sensor circuit 250 includes the inductive coupling inductor 206 that is inductively coupled with the inductor 216 that receives the position signal LP from an LDC 252 (e.g., corresponding to the LDC 20 in the example of FIG. 1). The first position inductor 208 is disposed in a contiguous approximately 180° portion and can be inductively coupled, depending on orientation of the inductive position element 202, with the first load inductor 218 that is controlled by a first switch $S_1$ (and which can collectively form an inductive load element). The pair of second position inductors 210 are each disposed in contiguous approximately 180° portions opposite each other and radially farther relative to the first position inductor 208. The pair of second position inductors 210 can be inductively coupled, depending on orientation of the inductive position element 202, with one or both of the respective second load inductors 220 that are controlled by a second switch $S_2$ and a third switch $S_3$ (and which can each collectively form respective inductive load elements). As demonstrated in the example of FIG. 6, the second position inductors 210 are wired in opposite polarity with respect to each other along a radial orientation. Therefore, the position inductors 210 can have an approximately equal and opposite inductive load based on the mutual inductance with the load inductors 220. The plurality of third position inductors 212 are disposed at approximately equal angles and distances, and can be inductively coupled, depending on orientation of the inductive position element 202, with the respective third load inductors 222 that are controlled by a fourth switch $S_4$, a fifth switch $S_5$, and a sixth switch $S_6$ (and which can each collectively form respective inductive load elements). As demonstrated in the example of FIG. 6, alternating ones of the third position inductors 212 are wired in opposite polarity with respect to the other third position inductors 212 along the radial orientation. Therefore, the position inductors 212 can have an approximately equal and opposite inductive load based on the mutual inductance with the load inductors 222.

Similar to as described previously, the position controller 18 can provide modulation signals $MOD_1$ through $MOD_6$ to sequentially activate the respective switches $S_1$ through $S_6$ to selectively activate the inductive load elements corresponding to the load inductors 218, 220, and 222, such that the position controller 18 can calculate a position of the inductive position element 202 based on respective sequential mutual inductances $IND_1$ through IND6 between the position inductors 208, 210, and 212 and the respective load inductors 218, 220, and 222. In the examples of FIGS. 5 and 6, based on the orientation-dependent inductive coupling of the first position inductor 208 and the respective first load inductor 218, the position controller 18 can calculate a first coarse angular position of the inductive position element 202 by determining an angular position of the inductive position element 202 within a 180° orientation increment. In other words, the position controller 18 can determine which 180° orientation the inductive position element 202 occupies based on a potential inductive coupling of the first position inductor 208 and the respective first load inductor 218, and thus a contribution to the inductive load of the position signal LP.

Similarly, based on the orientation-dependent inductive coupling of the pair of second position inductors 210 and the respective second load inductors 220, the position controller 18 can calculate a second coarse angular position of the inductive position element 202 by determining an angular position of the inductive position element 202 within a 90° orientation increment. In other words, the position controller 18 can determine which 90° orientation the inductive position element 202 occupies within the determined 180° orientation based on a potential inductive coupling of the second position inductors 210 and the respective second load inductors 220 and based on the relative polarity of the second position inductors 210, and thus a contribution to the inductive load of the position signal LP. Lastly, based on the orientation-dependent inductive coupling of the third position inductors 212 and the respective third load inductors 222, the position controller 18 can calculate a fine angular position of the inductive position element 202 by determining an angular position of the inductive position element 202 within the determined 90° orientation increment. In other words, the position controller 18 can determine an angular position of the inductive position element 202 within the determined 180° and 90° coarse orientations based on a potential inductive coupling of the third position inductors 212 and the respective second load inductors 222 and based on the relative polarity of the third position inductors 212, and thus a contribution to the inductive load of the position signal LP. Accordingly, the angular position sensor 200 and angular position sensor circuit 250 can calculate the angular position of the inductive position element 202 about a full 360° orientation.

It is to be understood that the angular position sensor 200 and the angular position sensor circuit 250 are not limited to as demonstrated in the examples of FIGS. 5 and 6. For example, the arrangement of the position inductors 208, 210, and 212 and the respective load inductors 218, 220, and 222 are not limited to as demonstrated in the examples of FIGS. 5 and 6. As an example, the position inductors 208, 210, and 212 and the respective load inductors 218, 220, and 222 can be arranged at different angles and/or at different radial distances from the axis 204 in approximately similar manners. As another example, the angular position sensor 200 and the angular position sensor circuit 250 could include more or less position inductors 208, 210, and 212 and the respective load inductors 218, 220, and 222 to provide a determination of the orientation of the inductive position element 202. Therefore, the angular position sensor 200 and the angular position sensor circuit 250 can be configured in a variety of ways.

Figure 7:
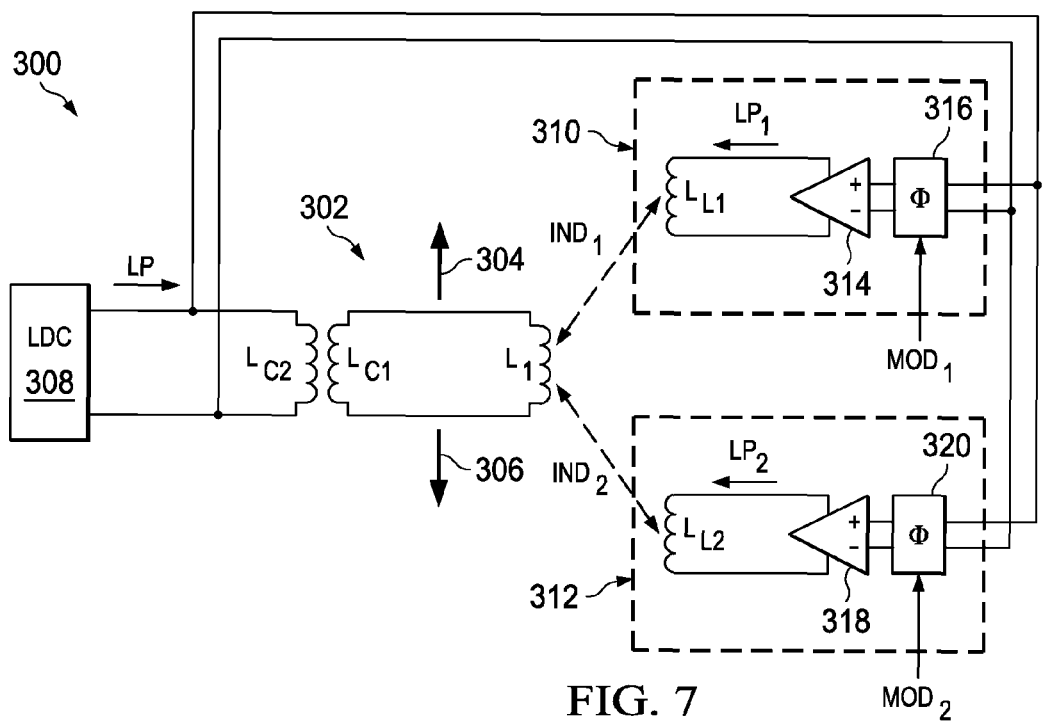
FIG. 7 illustrates another example of a position sensor circuit.

FIG. 7 illustrates another example of a position sensor circuit 300. The position sensor circuit 300 can correspond to the position sensor 10 in the example of FIG. 1. Therefore, the position sensor circuit 300 can be implemented in a variety of position sensing applications to detect a position of a device in a two-dimensional plane, such as to detect angular position.

The position sensor 300 includes an inductive position element 302 that is configured to move in a plane, such as laterally in one or two dimensions along the plane or rotating in the plane about an axis. In the example of FIG. 7, the movement of the inductive position element 302 is demonstrated by a first arrow 304 in a first direction and a second arrow 306 in a second direction opposite the first direction. The inductive position element 302 includes a position inductor $L_1$ arranged in a loop with an inductive coupling inductor $L_{C1}$. The system further includes an LDC 308 that can be associated with a position controller (e.g., substantially similar to the position controller 58 in the example of FIG. 2) that is configured to calculate a position of the inductive position element 302, as described herein. The LDC 308 is configured to generate a position signal LP that is provided to the inductive position element 302. As an example, the position signal LP can be configured as an AC signal having a predetermined frequency, as generated by the LDC 308. In the example of FIG. 7, the position signal LP is provided through an inductor $L_{C2}$, such that the position signal LP is induced into the inductive position element 302 to flow through the position inductor $L_1$ via the inductive coupling inductor $L_{C1}$ as a position-independent transformer. Therefore, the position signal LP is not conductively coupled to the inductive position element 302, and is thus galvanically isolated, such that the inductive position element 302 can be arranged, for example, as a disc or other rotating element (e.g., for calculation of angular position).

The position sensor 300 also includes a first inductive load element 310 and a second inductive load element 312 that are each positioned statically (e.g., fixed in position) with respect to the inductive position element 302. The first inductive load element 310 includes a load inductor $L_{L1}$, an amplifier 314, and a phase-shifter 316 that is controlled by a first modulation signal $MOD_1$. Similarly, the second inductive load element 312 includes a load inductor $L_{L2}$, an amplifier 318, and a phase-shifter 320 that is controlled by a second modulation signal $MOD_2$. As an example, the modulation signals $MOD_1$ and $MOD_2$ can be generated by a load modulator (e.g., similar to the load modulator 66 in the example of FIG. 2). In addition, in the example of FIG. 7, the position signal LP is provided to each of the first and second inductive load elements 310 and 312, such that a phase of the position signal LP is controlled via the respective phase-shifters 316 and 320 and amplified by the respective amplifiers 314 and 318 before flowing through respective load inductors $L_{L1}$ and $L_{L2}$ as respective signals $LP_1$ and $LP_2$. Accordingly, as described herein, the position of the inductive position element 302 can be calculated based on an additive flux technique.

In response to the signals $LP_1$ and $LP_2$, both of the load inductors $L_{L1}$ and $L_{L2}$ are inductively coupled with the position inductor $L_1$ to provide respective mutual inductances $IND_1$ and $IND_2$ between the position inductor $L_1$ and the respective load inductors $L_{L1}$ and $L_{L2}$. The modulation signals $MOD_1$ and $MOD_2$ can be configured to provide alternating phase-shifts of the position signal LP, such as by 180°, to provide either an additive flux or a subtractive flux of the respective load inductors $L_{L1}$ and $L_{L2}$ with respect to the position inductor $L_1$. Based on a disparate position of each of the load inductors $L_{L1}$ and $L_{L2}$, displacement of the position inductor $L_1$ relative to the load inductors $L_{L1}$ and $L_{L2}$ can provide different values of the respective mutual inductances $IND_1$ and $IND_2$, and thus a different inductive load on the position inductor $L_1$ based on the phase-shift of the respective signals $LP_1$ and $LP_2$. In the example of FIG. 7, movement of the inductive position element 302 in the direction of the arrow 304 can result in a larger mutual inductance $IND_1$ relative to the mutual inductance $IND_2$, whereas movement of the inductive position element 302 in the direction of the arrow 306 can result in a larger mutual inductance $IND_2$ relative to the mutual inductance $IND_1$, based on the position in three-dimensional space of the position inductor $L_1$ relative to the respective load inductors $L_{L1}$ and $L_{L2}$.

The position controller 308 can be configured to identify the contributions of the load inductors $L_{L1}$ and $L_{L2}$ to the inductive load of the position signal $L_1$ based on the inductance change of the signals $LP_1$ and $LP_2$ in response to the modulation signals $MOD_1$ and $MOD_2$. As an example, the modulation signals $MOD_1$ and $MOD_2$ can provide concurrent phase-shifts of the signals $LP_1$ and $LP_2$, or can provide phase-shifts of the signals $LP_1$ and $LP_2$ that are sequential with respect to each other. Therefore, the LDC 308 can be configured to monitor changes to the inductive load of the position signal $L_1$ based on the sequential phase-shift of the signals $LP_1$ and $LP_2$ in the respective first and second inductive load elements 312 and 314, and thus either an additive or subtractive flux with respect to the inductance of the position signal LP through the position inductor $L_1$. For example, in response to magnetic flux being added in the position inductor $L_1$ in response to a first phase-shift of the signals $LP_1$ and $LP_2$, the inductance of the position signal LP is increased (e.g., maximized), and in response to magnetic flux being subtracted in the position inductor $L_1$ in response to a second phase-shift of the signals $LP_1$ and $LP_2$, the inductance of the position signal LP is decreased (e.g., minimized). Therefore, the position controller 308 can be configured to calculate a position of the inductive position element 302 relative to the fixed position of the inductive load elements 312 and 314 based on the changes to the inductance of the position signal LP through the position inductor $L_1$ in response to the selective phase-shift of the signals $LP_1$ and $LP_2$ in each of the first and second inductive load elements 312 and 314.

As an example, the additive flux technique for detecting the position of the inductive position element 302 can be implemented in a variety of different ways, as described herein. For example, the inductive load elements 310 and 312 can be implemented in an angular position sensor, such as the angular position sensor 100 in the example of FIG. 3.

Figure 8:
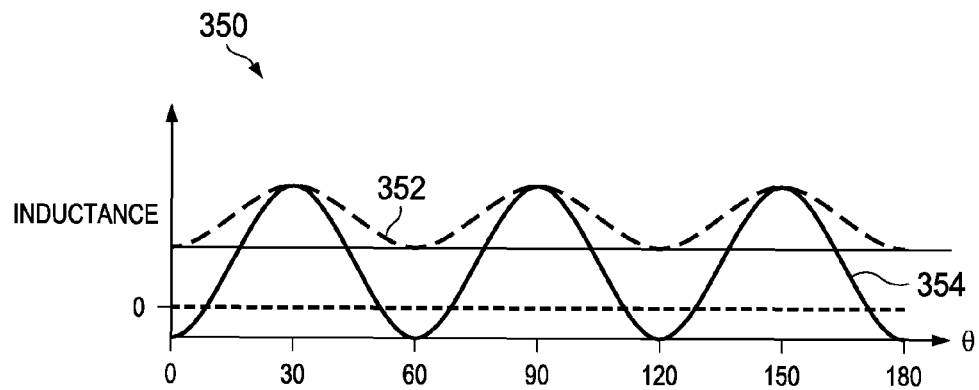
FIG. 8 illustrates another example of a graph of inductance relative to rotation angle.

FIG. 8 illustrates an example of a graph 350 of inductance relative to rotation angle. The graph 350 can correspond to rotation of the inductive position element 102 in the example of FIG. 3, such that a position controller can calculate the angular position θ of the inductive position element 102. The graph 350 can thus correspond to an inductance of the position signal LP based on selective phase-shift of the signals $LP_1$ and $LP_2$ of the first and second inductive load elements 310 and 312. Therefore, reference is to be made to the examples of FIGS. 3 and 7 in the following description of the example of FIG. 8.

The graph 350 demonstrates a first inductance line 352 over angle, demonstrated by the dashed line and a second inductance line 354 over angle, demonstrated by the solid line. The first inductance line 352 can correspond to a phase-shift of 0° of both the signals $LP_1$ and $LP_2$ relative to the position signal LP, and thus a subtractive magnetic flux contribution to the load of the position inductor $L_1$ via the mutual inductances $IND_1$ and $IND_2$ between one of the position inductors 108 and the load inductors 114 (e.g., the load inductors $L_{L1}$ and $L_{L2}$). Therefore, the first inductance line 352 is demonstrated as a sinusoid having a period that spans 60° and which has a relatively smaller peak-to-peak amplitude. Similarly, the second inductance line 354 can correspond to a phase-shift of 180° of both the signals $LP_1$ and $LP_2$ relative to the position signal LP, and thus an additive magnetic flux contribution to the load of the position inductor $L_1$ via the mutual inductances $IND_1$ and $IND_2$ between one of the position inductors 108 and the load inductors 114 (e.g., the load inductors $L_{L1}$ and $L_{L2}$). Therefore, the second inductance line 354 is demonstrated as a sinusoid having a period that likewise spans 60°, is in-phase with the first inductance line 352, and which has a relatively larger peak-to-peak amplitude.

Therefore, similar to as described previously, the associated position controller can be configured to calculate the angular position θ of the inductive position element 102 relative to the load inductors 114 based on the changes to the inductance of the position signal LP between the separate phase-shifts of the signals $LP_1$ and $LP_2$ in the respective first and second inductive load elements 310 and 312 based on the respective differences between the mutual inductance $IND_1$ and $IND_2$. For example, the modulation signals $MOD_1$ and $MOD_2$ can be provided to provide the alternating sequence of phase-shifts with respect to the signals $LP_1$ and $LP_2$ to vary the activation of the first and second inductive load elements 310 and 312 with respect to the phase-shifts to provide varying load on the position signal LP via the respective mutual inductances $IND_1$ and $IND_2$. Therefore, based on a difference in the inductance of the position signal LP in response to the varying load on the position signal LP via the respective mutual inductances $IND_1$ and $IND_2$, the associated position controller can calculate the angular position θ of the inductive position element 102. In the example of FIG. 8, the periods of the second and third inductance lines 352 and 354 repeat every 60°. As a result, the angular position sensor 100 has a detection range that is limited to 60°. However, the additive flux technique demonstrated in the examples of FIGS. 7 and 8 can likewise be applied to the angular position sensor system 200 in the example of FIG. 5 to increase the detection range for detecting the angular rotation θ. Alternatively, the additive flux technique can be implemented in another manner, as described in the example of FIG. 9.

Figure 9:
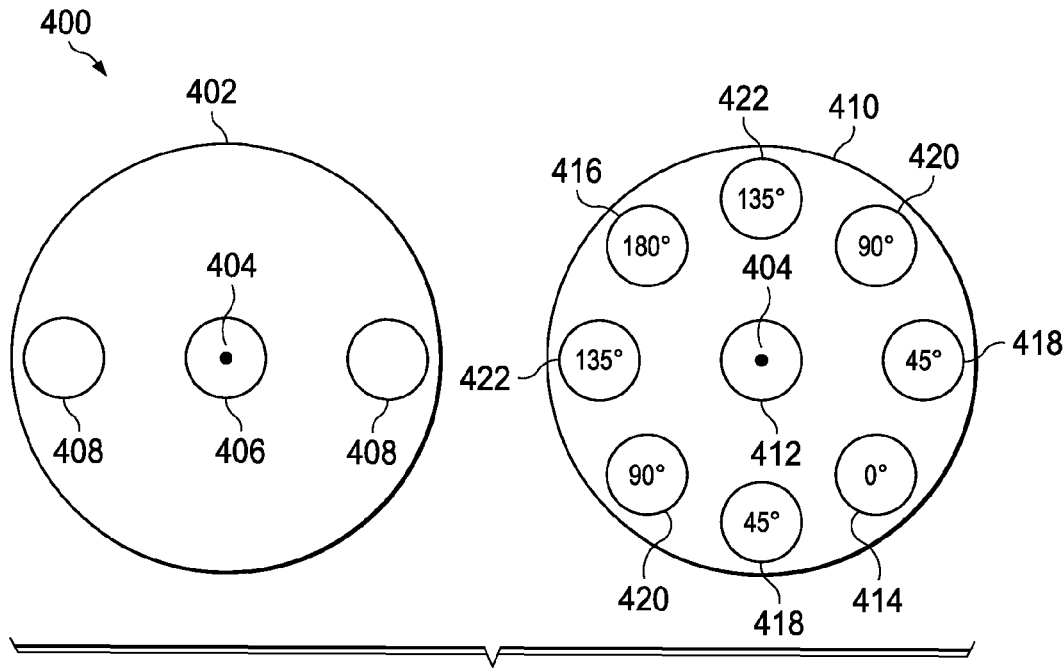
FIG. 9 illustrates yet another example of an angular position sensor.

FIG. 9 illustrates yet another example of an angular position sensor 400. The angular position sensor 400 can correspond to a portion of the position sensor 10, and can operate substantially similar to the position sensor circuit 300 described previously. Thus, reference is to be made to the examples of FIGS. 1 and 7 in the following description of the example of FIG. 9. Unlike the angular position sensor 100 which is demonstrated in the example of FIG. 3 in a plan view, the angular position sensor 400 is demonstrated in a deconstructed view. As described herein, the angular position sensor 400 can implement the additive flux technique, but can implement incremental phase-shifts of a plurality of load inductors instead of simultaneous alternating phase-shifts of the load inductors as demonstrated in the examples of FIGS. 7 and 8.

The angular position sensor 400 includes an inductive position element 402 that is configured as a disc that rotates about an axis 404. The inductive position element 402 includes an inductive coupling inductor 406 that substantially surrounds the axis 404, such that the inductive coupling inductor 406 is disposed about approximately 360° with respect to the axis 404. The inductive position element 402 also includes a pair of position inductors 408 that are disposed opposite each other, and thus approximately 180° with respect to each other about the axis 404. The position inductors 408 can be wired in series and with opposite polarity with respect to each other. As an example, the inductive position element 402 can be configured as a PCB, such that the inductive coupling inductor 406 and the position inductors 408 can be printed on a surface of the PCB.

The angular position sensor 400 also includes a stationary element 410 that can likewise be configured as a PCB that is substantially centered about and stationary with respect to the axis 404. Therefore, the inductive position element 402 and the stationary element 410 are each approximately centered about the axis 404, and are thus demonstrated in the deconstructed view for ease of demonstration and explanation. The stationary element 410 includes an inductor 412 that substantially surrounds the axis 404, such that the inductor 412 is disposed about approximately 360° with respect to the axis 404. The inductor 412 is configured to cooperate with the inductive coupling inductor 406 to form a position-independent transformer to provide the position signal LP to the position inductors 412, similar to as described previously in the example of FIG. 4.

The stationary element 410 also includes a first load inductor 414 that is associated with a 0° phase-shift of the position signal LP in a respective inductive load element, and a second load inductor 416 that is associated with a 180° phase-shift of the position signal LP in a respective inductive load element. The first and second load inductors 414 and 416 are disposed opposite each other, and thus approximately 180° with respect to each other about the axis 404. The 0° and 180° phase-shifts of the first and second load inductors 414 and 416 can be implemented, for example, by a phase-shifter and amplifier, similar to as demonstrated in the example of FIG. 7. The stationary element 410 also includes a first pair of load inductors 418 that are each associated with a 45° phase-shift of the position signal LP, a second pair of load inductors 420 that are each associated with a 90° phase-shift of the position signal LP, and a third pair of load inductors 422 that are each associated with a 135° phase-shift of the position signal LP. The first and third pairs of load inductors 418 and 422 are each disposed approximately 90° with respect to each other about the axis 404, and the second pair of load inductors 420 are disposed opposite, and thus 180°, with respect to each other, such that the first pair of load inductors 418 are disposed opposite the third pair of load inductors 422 with respect to the second pair of load inductors 422. The 45°, 90°, and 135° phase-shifts of the first, second, and third pairs of load inductors 418, 420, and 422 can be implemented, for example, by phase-shifters and amplifiers, similar to as demonstrated in the example of FIG. 7.

The 0°, 45°, 90°, 135°, and 180° phase-shifts of the position signal LP can be based on modulation signals, or can be based on providing the position signal LP through static phase-shifters in the respective inductive load elements. Therefore, based on the incremental phase shifts of the position signal LP, the associated position controller can be configured to calculate the position of the inductive position element 402 relative to the stationary element 410 based on determining a minimum inductive load and a maximum inductive load of the position inductors 408 through a period of the position signal LP. As an example, a sum of the resulting magnetic fields of the load inductors 414, 416, 418, 420, and 422 through a period of the position signal LP can have a single minimum and a single maximum, such that alignment of the position inductors 408 to the minimum and maximum can result in measurement of the minimum and maximum inductance by the associated position controller. Accordingly, the associated position controller can be calibrated to calculate the angular position of the inductive position element 402 based on the inductive load of the position signal LP relative to the minimum and maximum inductance based on the sum of the mutual inductance by each of the respective load inductors 414, 416, 418, 420, and 422 corresponding to a monotonic function of the position of the inductive position element 402. As another example, the 0°, 45°, 90°, 135°, and 180° phase-shifts can be controlled via the modulation signals MOD about the load inductors 414, 416, 418, 420, and 422. Therefore, the minimum and the maximum inductance of the load signal LP can be determined by the associated position controller, such that the angular position of the inductive position element 402 can be determined based on the phase-shift that results in the minimum and maximum inductance. As a result, the additive flux technique of the angular position sensor 400 can be implemented for real-time tracking of the angular position of the inductive position element 402.

Figure 10:
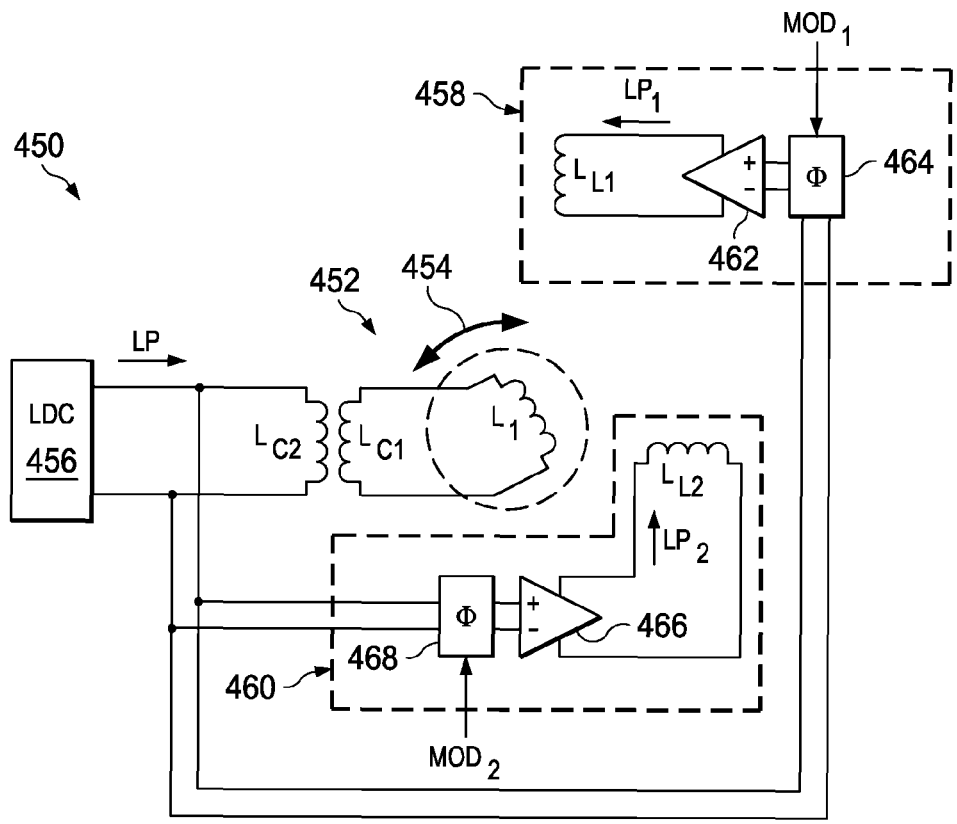
FIG. 10 illustrates yet another example of an angular position sensor circuit.

FIG. 10 illustrates yet another example of an angular position sensor circuit 450. The position sensor circuit 450 can correspond to the position sensor 10 in the example of FIG. 1. Therefore, the position sensor circuit 450 can be implemented in a variety of position sensing applications to detect an angular position of a device in a two-dimensional plane.

The position sensor 450 includes an inductive position element 452 that is configured to rotate in a plane. In the example of FIG. 10, the movement of the inductive position element 452 is demonstrated by a bidirectional arrow 454. The inductive position element 452 includes a position inductor $L_1$ arranged in a loop with an inductive coupling inductor $L_{C1}$. The system further includes an LDC 456 that can be associated with a position controller (e.g., substantially similar to the position element 58 in the example of FIG. 2) that is configured to calculate an angular position of the inductive position element 452, as described herein. The LDC 456 is configured to generate a position signal LP that is provided to the inductive position element 452 through the position inductor $L_1$, such that the position inductor $L_1$ generates a magnetic field that is in-plane with the rotating inductive position element 452. As an example, the position signal LP can be configured as an AC signal having a predetermined frequency, as generated by the LDC 456. In the example of FIG. 10, the position signal LP is provided through an inductor $L_{C2}$, such that the position signal LP is induced into the inductive position element 452 to flow through the position inductor $L_1$ via the inductive coupling inductor $L_{C1}$ as a position-independent transformer. Therefore, the position signal LP is not conductively coupled to the inductive position element 452, and is thus galvanically isolated, such that the inductive position element 452 can be arranged, for example, as a disc or other rotating element (e.g., for calculation of angular position).

The position sensor 450 also includes a first inductive load element 458 and a second inductive load element 460 that are each positioned statically (e.g., fixed in position) with respect to the inductive position element 452. The first inductive load element 458 includes a load inductor $L_{L1}$, an amplifier 462, and a phase-shifter 464 that is controlled by a first modulation signal $MOD_1$. Similarly, the second inductive load element 460 includes a load inductor $L_{L2}$, an amplifier 466, and a phase-shifter 468 that is controlled by a second modulation signal $MOD_2$. As an example, the modulation signals $MOD_1$ and $MOD_2$ can be generated by a load modulator (e.g., similar to the load modulator 66 in the example of FIG. 2). In addition, in the example of FIG. 10, the position signal LP is provided to each of the first and second inductive load elements 458 and 460, such that a phase of the position signal LP is controlled via the respective phase-shifters 464 and 468 and amplified by the respective amplifiers 462 and 466 before flowing through respective load inductors $L_{L1}$ and $L_{L2}$ as respective signals $LP_1$ and $LP_2$, similar to as described previously in the example of FIG. 7. Additionally, in the example of FIG. 10, the load inductors $L_{L1}$ and $L_{L2}$ are arranged at orthogonal angles with respect to each other, such as to provide magnetic fields in orthogonal directions in response to activation of the respective inductive load elements 458 and 460.

As an example, the modulation signals $MOD_1$ and $MOD_2$ can be configured to provide alternating phase-shifts of the position signal LP, such as by 180°, to provide either an additive flux or a subtractive flux of the respective load inductors $L_{L1}$ and $L_{L2}$ with respect to the position inductor $L_1$. In response to the sequential phase-shift of the signals $LP_1$ and $LP_2$, the respective load inductors $L_{L1}$ and $L_{L2}$ provide respective magnetic fields in-plane with the rotation of the inductive position element 452. As a result, the magnetic fields generated by the respective load inductors $L_{L1}$ and $L_{L2}$ can provide an additive or subtractive magnetic flux with the magnetic flux of the position inductor $L_1$ based on a relative angle of the position inductor $L_1$ and the load inductor $L_{L1}$ or $L_{L2}$ of the respective sequentially phase-shifted one of the inductive load elements 458 and 460. Therefore, the associated position controller can be configured to determine the angular position of the inductive position element 452. In the example of FIG. 10, the position can be determined to within a detection range of 360° based on a reversible polarity of the load inductors $L_{L1}$ and $L_{L2}$ in response to the selective switching through the inverters respective 462 and 464 relative to the possible orientations of the position inductor $L_1$. However, additional inductive load elements can be included in the position sensor 450, such as to increase resolution in calculating the angular position of the inductive position element 452. Additionally, different phase-shifts of the phase-shifters 464 and 468 can be implemented based on the modulation signals $MOD_1$ and $MOD_2$ to provide greater flexibility and higher resolution in calculating the rotation angle of the inductive position element 452.

Figure 11:
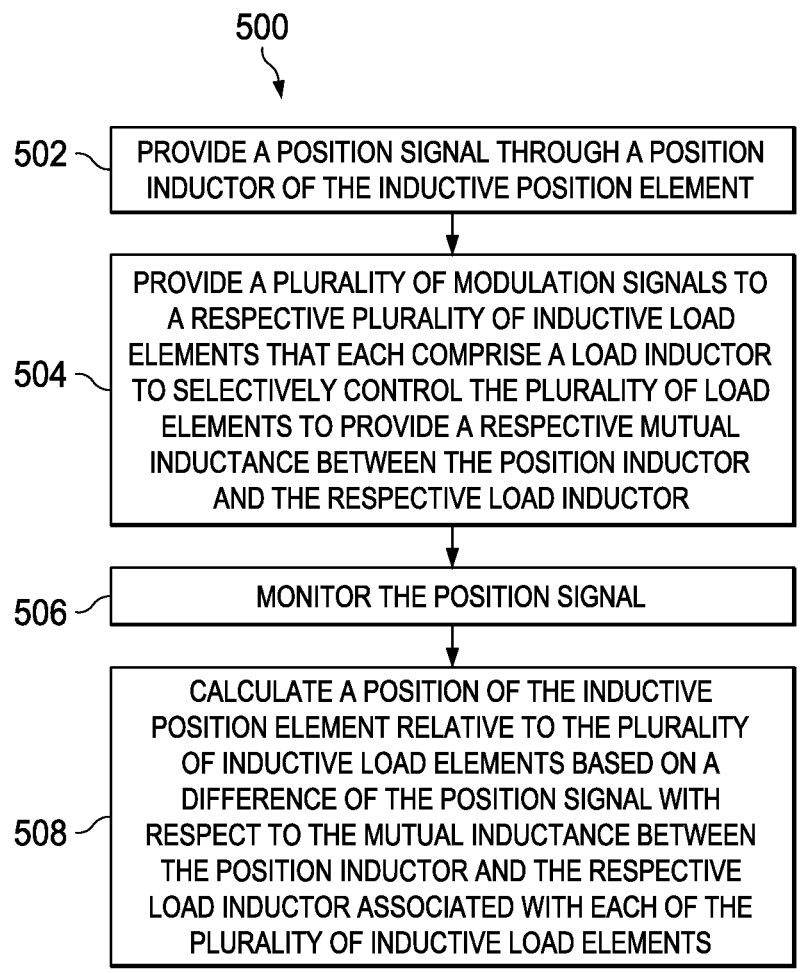
FIG. 11 illustrates an example of a method for measuring a position of an inductive position element.

In view of the foregoing structural and functional features described above, a method in accordance with various aspects of the present invention will be better appreciated with reference to FIG. 11. While, for purposes of simplicity of explanation, the method of FIG. 3 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect of the present invention.

FIG. 11 illustrates an example of a method 500 for measuring a position of an inductive position element (e.g., the inductive position element 12). At 502, a position signal (e.g., the position signal LP) is provided through a position inductor (e.g., the position inductor 14) of the inductive position element. At 504, a plurality of modulation signals (e.g., the modulation signals MOD) are provided to a respective plurality of inductive load elements (e.g., the inductive load elements 16) that each comprise a load inductor (e.g., the load inductors 22) to selectively control the plurality of load elements to provide a respective mutual inductance (e.g., the mutual inductance IND) between the position inductor and the respective load inductor. At 506, the position signal is monitored. At 508, a position of the inductive position element relative to the plurality of inductive load elements is calculated based on a difference of the position signal with respect to the mutual inductance between the position inductor and the respective load inductor associated with each of the plurality of inductive load elements.

What have been described above are examples of the invention. It is, of course, not possible to describe every conceivable combination of components or method for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims.

What is claimed is:

1. A position sensing system comprising:
an inductive position element that comprises a position inductor;
a plurality of inductive load elements, each comprising a load inductor;
the inductive position element movable relative to the inductive load elements;
the inductive position element coupled to receive position signals corresponding to an inductance associated with the position inductor;
each of the plurality of inductive load elements to be selectively controlled in response to modulation signals to provide a corresponding mutual inductance between the position inductor and the respective load inductor, the corresponding mutual inductance depending on a position of the inductive position element relative to the respective load inductor; and
a position controller to generate the position and modulation signals, and to convert the position signals to inductances associated with the position signals, and to calculate the position of the inductive position element relative to the plurality of inductive load elements based on a difference of the inductances associated with the position signals with respect to the mutual inductance between the position inductor and each respective load inductor.

2. The system of claim 1, wherein each of the plurality of inductive load elements comprises a switch to be controlled by a respective modulation signal, wherein each of the plurality of inductive load elements to be sequentially activated via the respective modulation signal associated with each respective inductive load element.

3. The system of claim 1, wherein the position controller comprises:
a load modulator to generate a plurality of modulation signals in a predetermined sequence, each of the plurality of modulation signals being associated with a respective one of the plurality of inductive load elements to activate the plurality of inductive load elements in the predetermined sequence; and
an inductance sensor to generate the position signals and to convert the inductances associated with the position signals to a displacement signal corresponding to the position of the inductive position element relative to the plurality of inductive load elements.

4. The system of claim 1, wherein the inductive position element comprises an inductive coupling to the position controller to receive the position signal and is configured to rotate about an axis, the position controller operable to calculate an angular position of the inductive position element relative to the plurality of inductive load elements based on the changes to the position signal in response to the respective changes to the inductive load between the position inductor and the respective load inductor associated with each of the plurality of inductive load elements.

5. The system of claim 4, wherein the position inductor comprises a plurality of position inductors arranged in series and disposed in a polar array about the inductive position element, wherein every alternating one of the plurality of position inductors has an opposite polarity relative to the remaining plurality of position inductors, wherein the plurality of load elements are disposed at predetermined fixed angles with respect to the axis.

6. The system of claim 5, wherein the inductive position element further comprises at least one additional inductor disposed along a contiguous portion within a first angle with respect to the axis of the inductive position element, wherein a first portion of the plurality of inductors are disposed within the first angle and wherein a second portion of the plurality of inductors are disposed outside of the first angle, wherein the plurality of load elements comprises at least one coarse measurement load element to be selectively activated to provide a respective inductive load of the respective at least one additional inductor to provide a coarse measurement indication of the angular position of the inductive position element.

7. The system of claim 5, wherein the inductive position element comprises:
an inductive coupling inductor to provide the inductive coupling to the position controller;
a first position inductor arranged in series with the inductive coupling inductor and being disposed along a contiguous portion of approximately 180° of the inductive position element to provide inductive coupling with a first load element to determine a first coarse measurement of the position of the inductive position element;
a pair of second position inductors arranged in series with each other and with the first position inductor and disposed along respective contiguous portions of approximately 180° of the inductive position element to provide inductive coupling with a pair of second load elements arranged orthogonally with respect to each other to determine a second coarse measurement of the position of the inductive position element; and
a plurality of third position inductors arranged in series with each other and with the pair of second position inductors and being disposed in a polar array at approximately equal angles with respect to the axis to provide inductive coupling with a plurality of third load elements arranged at predetermined angles with respect to the axis to determine a fine measurement of the position of the inductive position element.

8. The system of claim 5, wherein the position controller is configured to provide the position signal to each of the plurality of load elements and to provide a phase-shift of the position signal with respect to each of the plurality of load elements based on the respective modulation signal, wherein the position controller is configured to calculate the position of the inductive position element relative to the plurality of inductive load elements based on a minimum inductive load and a maximum inductive load through a period of the position signal based on the respective phase-shift of the position signal with respect to each of the plurality of load elements.

9. The system of claim 4, wherein position inductor is arranged to generate an axial magnetic field in-plane with the inductive position element, such that the axial magnetic field is orthogonal to the axis, wherein the plurality of load elements comprises a first load element and a second load element that are alternately activated via the modulation signals, the load inductor in each of the first and second load elements being arranged orthogonally with respect to each other and comprising axial magnetic fields that are likewise in-plane with the inductive position element.

10. The system of claim 1, wherein each of the plurality of load elements comprises:
an amplifier configured to receive and amplify the position signal to provide the amplified position signal through the load inductor; and
a phase-shifter configured to provide a respective phase-shift of the position signal based on the modulation signal to provide a sequential phase-shift of the position signal through the load inductor relative to the load inductor associated with each other one of the plurality of load elements.

11. The system of claim 1, wherein each of the plurality of inductive load elements further comprises a capacitor, such that the capacitor and the respective load inductor are operable as a resonator in response to activation of the respective one of the plurality of inductive load elements.

12. A method for inductive position measurement, the method comprising:
configuring an inductive position element, including a position inductor, for movement past a plurality of inductive load elements, each including a load inductor;
providing position signals through the position inductor of the inductive position element corresponding to an inductance associated with the position inductor;
providing a plurality of modulation signals to a respective plurality of the inductive load elements to selectively control the plurality of inductive load elements to provide a respective mutual inductance between the position inductor and the respective load inductor;
monitoring the position inductor via the position signals, and converting the position signals to inductances associated with the position signals; and
calculating a position of the inductive position element relative to the plurality of inductive load elements based on a difference of the inductances associated with the position signals with respect to the mutual inductance between the position inductor and each respective load inductor.

13. The method of claim 12, further comprising:
providing the position signal to each of the plurality of inductive load elements; and
amplifying the position signal to provide the amplified position signal through the load inductor associated with each of the plurality of inductive load elements, wherein providing the plurality of modulation signals comprises providing a sequential phase-shift of the position signal associated with each of the plurality of inductive load elements via a respective one of the plurality of modulation signals.

14. The method of claim 13, wherein monitoring the inductive load comprises monitoring the inductive load to determine a minimum inductive load and a maximum inductive load through a period of the position signal, and wherein calculating the position comprises calculate the position of the inductive position element relative to the plurality of inductive load elements based on the minimum and maximum inductive loads through the period of the position signal based on the respective phase-shift of the position signal with respect to each of the plurality of load elements.

15. The method of claim 14, wherein providing the plurality of modulation signals comprises providing a constant phase-shift of the position signal in each of the plurality of inductive load elements, wherein monitoring the position inductor comprises calculating a sum of mutual inductance of the position inductor relative to the load inductor associated with each of the plurality of inductive load elements, and wherein calculating the position of the inductive position element comprises calculating the position of the inductive position element based on the sum of the mutual inductance of the position inductor relative to the load inductor associated with each of the plurality of inductive load elements.

16. The method of claim 12, wherein generating the position signals comprises providing the position signals through a position controller inductor that is inductively coupled to an inductive coupling inductor of the inductive position element that is configured to rotate about an axis, the inductive coupling inductor being arranged in series with a plurality of position inductors arranged in a polar array about the inductive position element with respect to the axis, wherein every alternating one of the plurality of position inductors has an opposite polarity relative to the remaining plurality of position inductors.

17. The method of claim 16, wherein the plurality of position inductors comprises:
at least one first position inductor arranged in series with the inductive coupling inductor and being disposed along a contiguous portion of approximately 180° of the inductive position element to provide inductive coupling with a first load element to determine a coarse measurement of the position of the inductive position element; and
a plurality of second position inductors that are arranged in series with each other and with the at least one first position inductor and being disposed in the polar array at approximately equal angles with respect to the axis to provide inductive coupling with a plurality of second load elements arranged at predetermined angles with respect to the axis to determine a fine measurement of the position of the inductive position element.

18. A position sensing system comprising:
an inductive position element configured to rotate about an axis and comprising a plurality of position inductors arranged in series to receive a position signal corresponding to an inductance associated with the position inductors, wherein every alternating one of the plurality of position inductors has an opposite polarity relative to the remaining plurality of position inductors;
a plurality of inductive load elements, each comprising a load inductor, each of the plurality of inductive load elements being selectively controlled in response to a modulation signal to provide a corresponding mutual inductance between the position inductor and the respective load inductor, such that each of the plurality of inductive load elements are sequentially activated in response to the respective modulation signal provided to each of the respective plurality of inductive load elements, the corresponding mutual inductance depending on an angular position of the inductive position element relative to the respective load inductor; and
a position controller to generate the position and modulations signals, and to convert the position signals to inductances associated with the position signals, and to calculate the angular position of the inductive position element relative to the plurality of inductive load elements based on a difference of the inductance associated with the position signal with respect to the mutual inductance between the position inductor and each respective load inductor.

19. The system of claim 18, wherein the plurality of position inductors are disposed in a polar array about the inductive position element, wherein the inductive position element further comprises at least one additional inductor disposed along a contiguous portion within a first angle with respect to the axis of the inductive position element, wherein a first portion of the plurality of inductors are disposed within the first angle and wherein a second portion of the plurality of inductors are disposed outside of the first angle, wherein the plurality of load elements comprises at least one coarse measurement load element to be selectively activated to provide a respective inductive load of the respective at least one additional inductor to provide a coarse measurement indication of the angular position of the inductive position element.

20. The system of claim 18, wherein each of the plurality of load elements comprises:
an amplifier configured to receive and amplify the position signal to provide the amplified position signal through the load inductor; and
a phase-shifter configured to provide a respective phase-shift of the position signal based on the modulation signal to provide a sequential phase-shift of the position signal through the load inductor relative to the load inductor associated with each other one of the plurality of load elements.

* * * * *